United States Patent
Mian et al.

(10) Patent No.: US 7,536,278 B2
(45) Date of Patent: May 19, 2009

(54) INSPECTION METHOD, SYSTEM, AND PROGRAM PRODUCT

(75) Inventors: Zahid F. Mian, Loudonville, NY (US); Jeremy C. Mullaney, Troy, NY (US); Ryk E. Spoor, Troy, NY (US)

(73) Assignee: International Electronic Machines Corporation, Troy, NY (US)

( * ) Notice: Subject to any disclaimer, the term of this patent is extended or adjusted under 35 U.S.C. 154(b) by 143 days.

(21) Appl. No.: 11/136,207

(22) Filed: May 24, 2005

(65) Prior Publication Data

US 2005/0267707 A1 Dec. 1, 2005

Related U.S. Application Data

(60) Provisional application No. 60/574,580, filed on May 27, 2004.

(51) Int. Cl.
G06F 11/30 (2006.01)
(52) U.S. Cl. .................................................. 702/184
(58) Field of Classification Search ................. 702/184; 700/287; 701/33; 707/200
See application file for complete search history.

(56) References Cited

U.S. PATENT DOCUMENTS

| | | | |
|---|---|---|---|
| 4,904,939 A | 2/1990 | Mian | |
| 5,636,026 A | 6/1997 | Mian et al. | |
| 6,594,621 B1* | 7/2003 | Meeker | 702/185 |
| 6,959,235 B1* | 10/2005 | Abdel-Malek et al. | 701/33 |
| 7,266,429 B2* | 9/2007 | Travaly et al. | 700/287 |
| 2002/0138269 A1* | 9/2002 | Philley | 704/260 |
| 2003/0105566 A1* | 6/2003 | Miller | 701/33 |
| 2003/0212494 A1* | 11/2003 | Alexander et al. | 702/5 |
| 2004/0133319 A1* | 7/2004 | Pillar et al. | 701/29 |
| 2005/0038825 A1* | 2/2005 | Tarabzouni et al. | 707/200 |

OTHER PUBLICATIONS

Author unknown, "Office Depot, Symbol Technologies, and BarPoint.com Offer Mobile Scanning Computer," printed from http://www.techonline.com/community/member_company/non_member/news/1727/content_12 . . . on May 4, 2005, Jan. 11, 2001.

* cited by examiner

*Primary Examiner*—Tung S Lau
*Assistant Examiner*—Xiuquin Sun
(74) *Attorney, Agent, or Firm*—Hoffman Warnick LLC

(57) ABSTRACT

An improved solution for performing an inspection is provided, in which a user can use a handheld computing device to obtain and/or record the set of attributes required for the inspection. In particular, an inspection schedule can be initiated on the handheld computing device and the user can be prompted for the various attributes based on the inspection schedule. Various solutions can be incorporated for receiving the attributes on the handheld computing device, including manual entry, audible entry and/or one or more data sensing devices. Subsequently, the set of attributes can be communicated to a base station for further processing and/or more permanent storage.

27 Claims, 9 Drawing Sheets

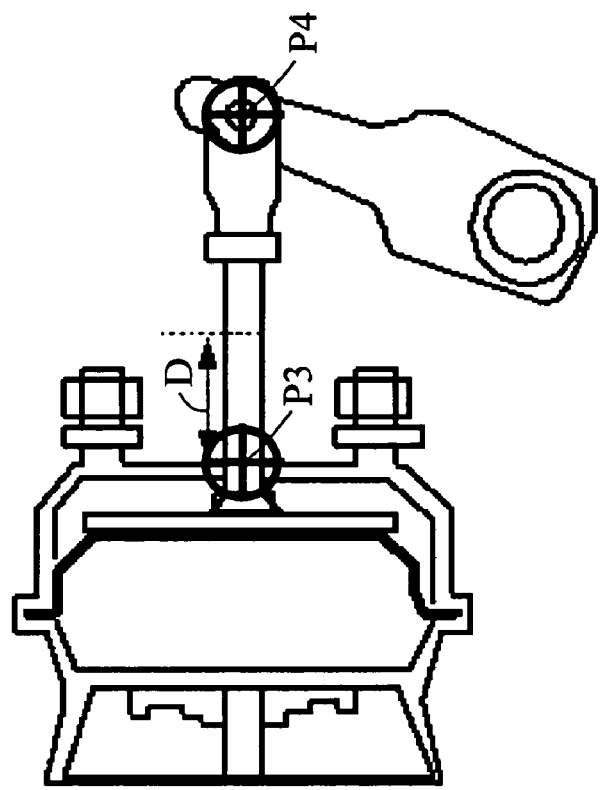
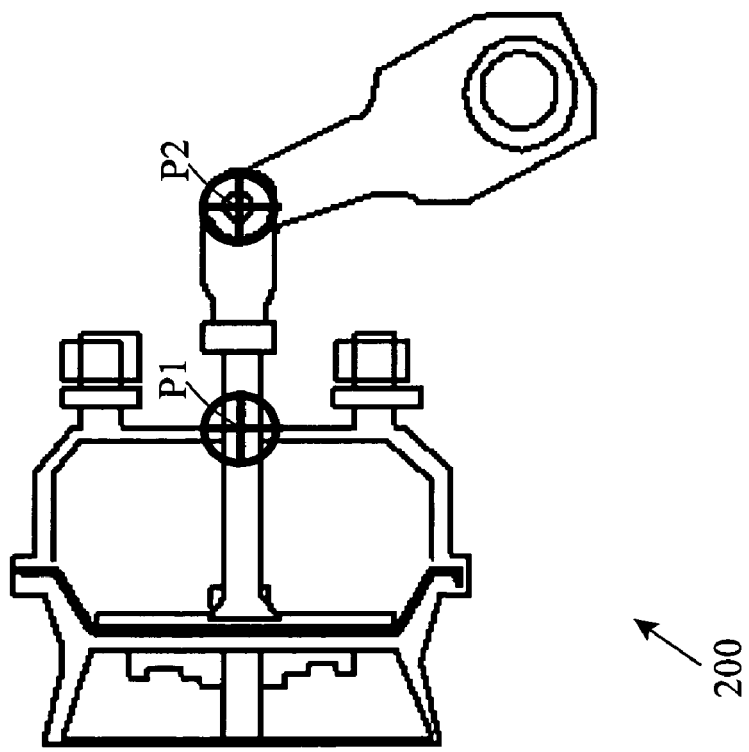

INSPECTION METHOD, SYSTEM, AND PROGRAM PRODUCT

REFERENCE TO RELATED APPLICATION

The current application claims the benefit of U.S. Provisional Application No. 60/574,580, filed on May 27, 2004, which is hereby incorporated herein by reference.

GOVERNMENT LICENSE RIGHTS

The U.S. Government has a paid-up license in this invention and the right in limited circumstances to require the patent owner to license others on reasonable terms as provided for by the terms of Contract Nos. DTRS57-02-C-10059 and DTRS57-04-C-10059 awarded by the United States Department of Transportation.

BACKGROUND OF THE INVENTION

1. Technical Field

The invention relates generally to inspections, and more specifically, to a method, system and program product that enables a user to perform an inspection using a handheld computing device such as a personal digital assistant (PDA).

2. Background Art

Inspections, such as commercial vehicle inspections, are performed throughout the world each day. Generally, to complete the inspection, an inspector must electronically and/or manually fill out a standard inspection form. However, while the inspector performs the inspection, he/she typically makes notes in a notebook or the like, which are subsequently used to complete the inspection form. This process is tedious, clumsy, and time-consuming for the inspector. Inclement weather and/or darkness can further add to the difficulty of performing the inspection. To this extent, while performing the inspection, the inspector may need to carry a notebook, a writing utensil, one or more measuring devices, a flashlight, etc. For example, a typical commercial vehicle inspection includes an interview with the driver and an examination of the vehicle. In this case, the inspector must make notes of the interview as well as various attributes of the vehicle. The inspected vehicle attributes can be both easily observable (e.g., license plate) as well as only observable with difficulty and the use of a measuring device (e.g., one or more attributes of the vehicle's braking system).

As a result, one or more errors can be readily introduced into the current inspection process. For example, one or more errors can occur due to incorrectly and/or illegibly written figures, the presence of water, dirt, grease, etc., on the notebook, a misreading of a measuring device, inattentiveness while transcribing the data, etc. Additional problems may be present for other types of inspections. For example, when a vehicle is inspected upon entering/leaving a secured area (e.g., a military base, a national border, etc.) for contraband, hidden weapons, explosives, etc., the personal risk for the inspector increases. In this case, it becomes more desirable to enable the inspector to perform the inspection without the use of one or both hands.

In response, some devices have been manufactured to assist the inspector. For example, a mirror can be used to examine the undercarriage of a vehicle while the inspector remains standing. However, this solution is limited by the effectiveness with which the examination can be conducted. Further, a remote-controlled device and/or stationary device can be used to inspect beneath a vehicle. However, current devices are complex and expensive, have limited flexibility in the types of applications for which they can be used, and/or require accurate placement of the inspected object (e.g., a vehicle).

Increasingly, computing devices are being manufactured on a smaller scale. One common application for the smaller computing devices is the collection and storage of data, e.g., datalogging. To this extent, some custom devices have been proposed to assist in the collection of data when conducting an inspection. However, these devices are customized for a particular inspection application, limiting their use in other types of settings. Additionally, the use of personal digital assistants (PDAs) has increased. A PDA comprises a handheld computing device that can be used to organize personal information, such as a name and address database, to-do list, etc. Other uses have been proposed for PDAs, including airline check-in and, when equipped with a bar code scanner, the collection of item pricing and selected items for purchase in a store. However, no solution has incorporated a PDA or similar handheld computing device into a generic inspection solution.

As a result, a need exists for an improved solution for performing an inspection. In particular, a need exists for a method, system, and program product that enable the use of a handheld computing device, such as a PDA, to receive, store, and/or analyze data for the inspection.

SUMMARY OF THE INVENTION

The invention provides an improved solution for performing an inspection. Specifically, under the present invention, a handheld computing device can include an inspection system that initiates and performs an inspection schedule. In particular, the handheld computing device can prompt a user (e.g., the inspector) to acquire a set of attributes based on the inspection schedule. During the inspection, each attribute in the set of attributes can be received, stored, and/or processed on the handheld computing device. The handheld computing device can communicate the set of attributes to a base station for further processing and/or more permanent storage. To this extent, the base station and/or handheld computing device can obtain background data for the inspection from a central repository, which can be used when processing the attribute (s). After processing the set of attributes, the inspection system may request the acquisition of one or more additional attributes, which can be acquired using handheld computing device. Various solutions can be used to acquire each attribute. For example, the user can speak the attribute, enter the attribute manually, and/or one or more data sensing systems in communication with the handheld computing device can obtain and provide the attribute. As a result, the invention provides an improved solution for performing an inspection that reduces the possibility for error by eliminating much of the duplicative, tedious and time consuming work required by the inspector, while also enabling various attributes to be obtained without the use of one or both hands of the inspector.

A first aspect of the invention provides a method of performing an inspection, the method comprising: initiating an inspection schedule on a handheld computing device; and performing the inspection using the handheld computing device, wherein the performing includes: prompting a user of the handheld computing device to acquire a first set of attributes based on the inspection schedule; and receiving the first set of attributes on the handheld computing device.

A second aspect of the invention provides a system for performing an inspection, the system comprising: a data sensing system; and a handheld computing device that includes: means for initiating an inspection schedule; and means for receiving a set of attributes from the data sensing system based on the inspection schedule.

A third aspect of the invention provides a personal digital assistant (PDA) comprising: means for communicating with a data sensing system; and means for performing an inspection that includes: means for initiating an inspection schedule for the inspection; and means for receiving a set of attributes based on the inspection schedule, wherein at least a portion of the set of attributes is received from the data sensing system.

A fourth aspect of the invention provides a program product stored in a computer-readable medium, which when executed, enables a user of a personal digital assistant (PDA) to perform an inspection, the program product comprising: means for communicating with a data sensing system; means for initiating an inspection schedule for the inspection; means for receiving a set of attributes based on the inspection schedule, wherein at least a portion of the set of attributes is received from the data sensing system.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIGS. 8A-B show an illustrative solution for manually obtaining data points for the air brake system of FIGS. 7A-B.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
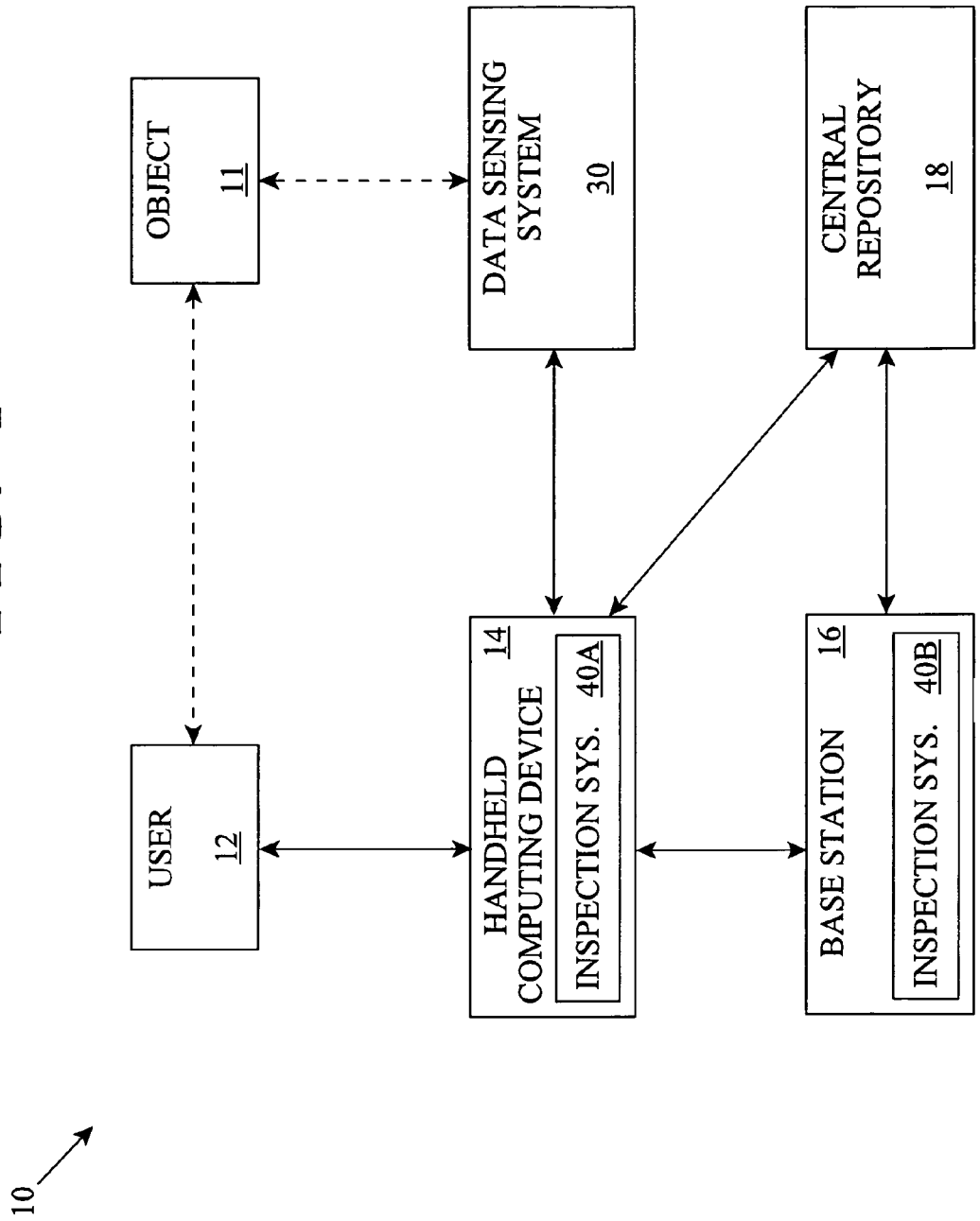
FIG. 1 shows an illustrative system for performing an inspection according to one embodiment of the invention.

As indicated above, the invention provides an improved solution for performing an inspection. Specifically, under the present invention, a handheld computing device can include an inspection system that initiates and performs an inspection schedule. In particular, the handheld computing device can prompt a user (e.g., the inspector) to acquire a set of attributes based on the inspection schedule. During the inspection, each attribute in the set of attributes can be received, stored, and/or processed on the handheld computing device. The handheld computing device can communicate the set of attributes to a base station for further processing and/or more permanent storage. To this extent, the base station and/or handheld computing device can obtain background data for the inspection from a central repository, which can be used when processing the attribute(s). After processing the set of attributes, the inspection system may request the acquisition of one or more additional attributes, which can be acquired using handheld computing device. Various solutions can be used to acquire each attribute. For example, the user can speak the attribute, enter the attribute manually, and/or one or more data sensing systems in communication with the handheld computing device can obtain and provide the attribute. As a result, the invention provides an improved solution for performing an inspection that reduces the possibility for error by eliminating much of the duplicative, tedious and time consuming work required by the inspector, while also enabling various attributes to be obtained without the use of one or both hands of the inspector.

As used herein, the term "inspection" means any type of examination of an object or a group of objects. In particular, an inspection includes the measurement and/or logging of one or more attributes of the object(s) based on a defined schedule. For example, the inspection can comprise an examination of various attributes of a vehicle, such as a roadside inspection of a commercial vehicle, its contents, and/or its driver, a periodic state inspection of the various systems of the vehicle, a periodic inspection of a train or aircraft, or the like. Similarly, the inspection can comprise other types of examinations performed by military and/or law enforcement personnel, such as an examination of an object (e.g., vehicle, container, etc.) intending to enter/leave a secured area (e.g., a border, a port, etc.). Further, the inspection can comprise other types of examinations performed by a regulator, such as an examination of food, a food-related business, and the like. To this extent, the inspection typically is performed by one or more individuals and follows a particular inspection schedule.

As noted above, the inspection schedule defines a set (one or more) of "attributes" for the object(s) that are to be examined. An attribute can comprise any type of observable/measurable quality or characteristic of one or more objects. For example, as indicated above, when a commercial vehicle is inspected, attributes can be obtained for the vehicle, its contents, and/or the driver. To this extent, the attributes for the commercial vehicle inspection can include attributes for the vehicle, such as a license plate, a gross vehicle weight, the operating status of one or more important systems (e.g., brakes), tread wear, exhaust emissions analysis, noise emissions, etc.; attributes for the contents, such as a type of contents, a hazardous material status, a humidity, a temperature, etc.; and attributes for the driver, such as a name, a driver's license number, a state of sobriety, a driving log, etc.

Turning to the drawings, FIG. 1 shows an illustrative system 10 for performing an inspection on one or more objects 11. In general, the inspection comprises receiving and/or recording (e.g., storing) a set attributes of the one or more object(s) 11 on a handheld computing device 14 that is operated by a user 12. To this extent, user 12 can manually observe, request, etc., one or more of the attributes and/or a data sensing system 30 can acquire one or more of the attributes automatically or in response to a request by user 12. In either case, the set of attributes are provided to an inspection system 40A implemented on handheld computing device 14, which can evaluate (i.e., process) the set of attributes. Additionally, inspection system 40A can communicate some or all of the set of attributes to an inspection system 40B, shown implemented on a base station 16, for additional processing and/or more permanent storage. For example, inspection system 40A and/or 40B can compare one or more attributes with data stored and obtained from a central repository 18 and/or generate a follow-up query requesting additional attribute(s) in response to one or more of the set of attributes received for the inspection.

Handheld computing device 14 can communicate with data sensing system 30, base station 16, and/or central repository 18 using a physical communications link (e.g., a wire, a communications port, etc.) and/or a wireless communications link. Similarly, communications between base station 16 and central repository 18 can use any combination of physical and/or wireless communications links. In any event, communications between the various computing systems (e.g., handheld computing device 14, data sensing system 30, base station 16, and central repository 18) can occur over one or more networks (not shown) that comprise any combination of various types of networks, including a one-to-one connection, a (wireless) local area network, the Internet, etc. To this extent, connectivity and communications between the various computing systems can be implemented using any known protocol(s).

Figure 2:
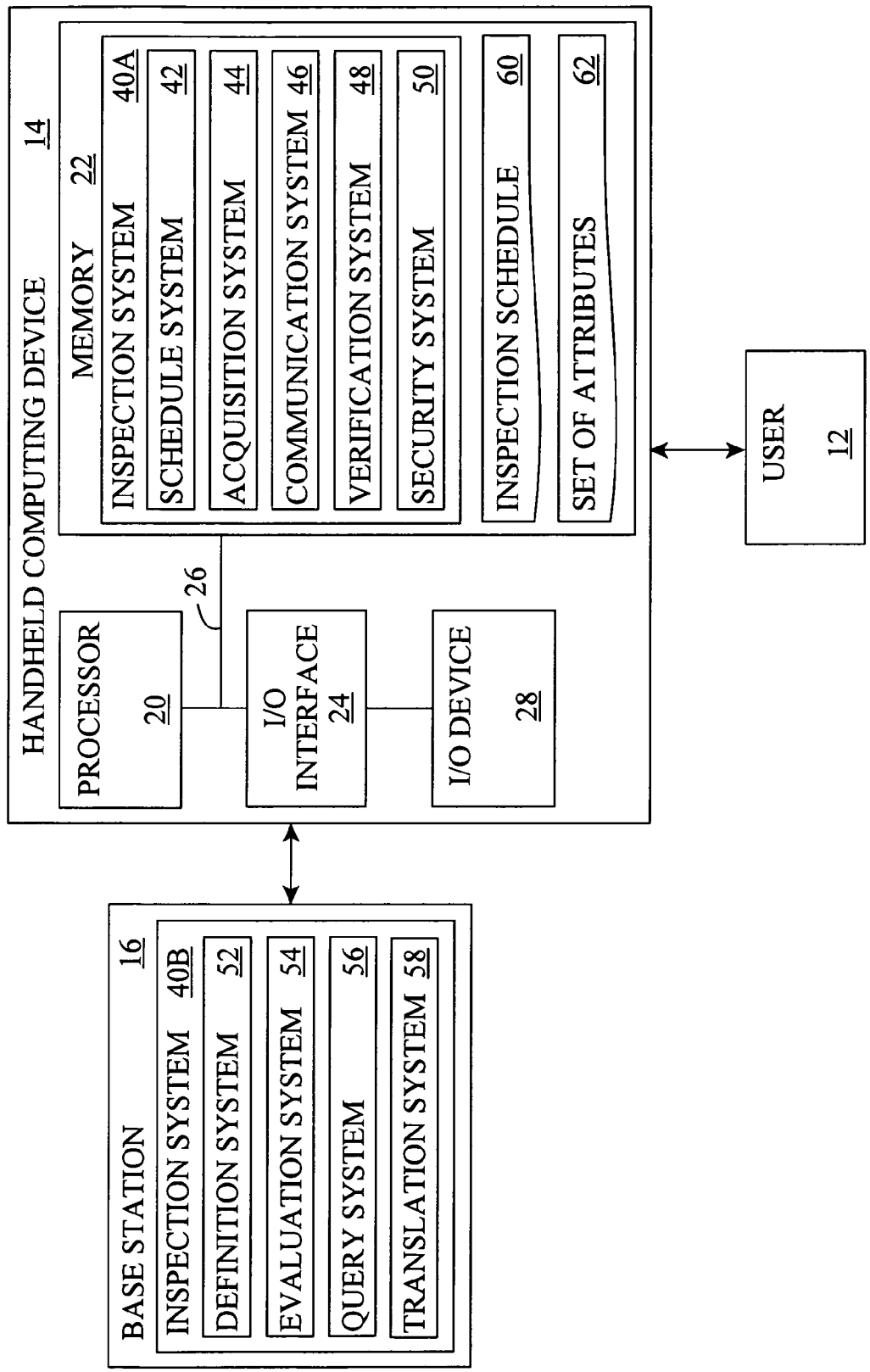
FIG. 2 shows a more detailed view of the handheld computing device and the base station of FIG. 1.

FIG. 2 shows a more detailed view of handheld computing device 14 and base station 16 according to one embodiment of the invention. In this case, inspection system 40A is shown implemented on handheld computing device 14 as a program product. Similarly, inspection system 40B can be implemented on base station 16 as a program product. However, it is understood that some or all of the functionality described for inspection systems 40A-B could be implemented as hardware and/or firmware. In any event, handheld computing device 14 can comprise any type of compact computing system capable of being readily carried and/or operated by user 12. For example, handheld computing device 14 can comprise a personal digital assistant (PDA), a palmtop, a multifunction mobile telephone, etc., that is capable of being programmed with and executing a program product such as inspection system 40A.

To this extent, handheld computing device 14 is shown including a processor 20, a memory 22, an input/output (I/O) interface 24, a bus 26, and an I/O device 28. In general, processor 20 executes computer program code, such as inspection system 40A, that is stored in memory 22. While executing the computer program code, processor 20 can read and/or write data (e.g., set of attributes 62) to/from memory 22 and/or I/O interface 24. Bus 26 provides a communication link between each of the components in handheld computing device 14.

Handheld computing device 14 is only illustrative of various possible combinations of hardware. For example, processor 20 may comprise one or more processing units that share the execution of inspection system 40A. Similarly, memory 22 can comprise any combination of various types of read only, read/write, fixed, portable, volatile, nonvolatile, etc., computer-readable mediums and/or devices. Further, I/O interface 24 can comprise any system for exchanging information with one or more I/O devices 28, which in turn provide an interface (e.g., a communications port, a wireless communications system) with one or more other computing systems and/or an interface (e.g., a pointing device, a display, etc.) with user 12. It is understood that base station 16, central repository 18, and/or data sensing system 30 (FIG. 1) can include the same components (e.g., processor, memory, I/O interface, etc.) as shown for handheld computing device 14. These components have not been separately shown and discussed for brevity.

In any event, user 12 utilizes inspection systems 40A-B to perform an inspection. To this extent, inspection system 40A is shown including a schedule system 42 for initiating an inspection schedule 60, an acquisition system 44 for receiving a set of attributes 62 based on inspection schedule 60, and a communication system 46 for communicating set of attributes 62 to base station 16 (e.g., inspection system 40B) and/or central repository 18. Further, inspection system 40A can include a verification system 48 for verifying access rights of user 12 and a security system 50 for performing one or more security actions in response to a failure to verify the access rights. Additionally, inspection system 40B is shown including a definition system 52 for obtaining inspection schedule 60 and providing inspection schedule 60 to inspection system 40A, an evaluation system 54 for evaluating set of attributes 62, a query system 56 for providing a query to inspection system 40A, and a translation system 58 for communicating data to/from central repository 18 (FIG. 1) and/or handheld computing device 14.

Operation of each of the systems is discussed further below. However, it is understood that some of the various systems shown in inspection systems 40A-B can be implemented independently, combined, and/or implemented on another computing system. For example, handheld computing device 14 can comprise all the functionality and/or systems shown and discussed as being implemented on handheld computing device 14, data sensing system 30 (FIG. 1), and base station 16. In this case, base station 16 may not be implemented as a part of system 10. Alternatively, inspection systems 40A-B could both be implemented on base station 16, and handheld computing device 14 could be used to obtain set of attributes 62 and forward them to base station 16 for processing. Additionally, it is understood that some of the systems and/or functionality may not be implemented, or additional systems and/or functionality may be included as part of inspection systems 40A-B.

Referring to FIGS. 1 and 2, definition system 52 can obtain inspection schedule 60. Inspection schedule 60 can be obtained using any known solution. For example, definition system 52 can receive/retrieve inspection schedule 60 from central repository 18. In this case, central repository 18 can comprise a public or private government database, corporate database, or the like, that defines inspection schedule 60. Further, definition system 52 can enable an administrator or the like to utilize base station 16 to create and/or modify inspection schedule 60. In any event, once obtained, definition system 52 can provide inspection schedule 60 to schedule system 42 for use on handheld computing device 14 when performing the inspection.

After schedule system 42 has received/retrieved inspection schedule 60, user 12 can request that schedule system 42 initiate inspection schedule 60 to perform the inspection. Subsequently, schedule system 42 can initiate inspection schedule 60 on handheld computing device 14. In particular, schedule system 42 can perform various operations to initialize handheld computing device 14 and/or inspection system 40A to perform inspection schedule 60. For example, schedule system 42 can determine that all required data sensing systems 30 are available, that inspection system 40A can communicate with base station 16 and/or central repository 18, etc. Should one or more of the operations fail, schedule system 42 can generate an error and notify user 12 of the problem. In response, user 12 can be provided with the options to continue or abort the inspection. Further, it is understood that while inspection schedule 60 may define a particular order by which the inspection data is obtained, user 12 can obtain the inspection data in any order, can re-measure data, and the like while performing the inspection. Still further it is understood that the order and/or contents of an inspection may or may not vary. For example, inspection schedule 60 can define a set of procedures to be followed (e.g., perform A, then B, then C, etc.) define a set of procedures to arrive at a goal (e.g., based on an expert system or the like), and/or define a set of conditionals (inspect X if condition A, inspect Y if X presents condition B, etc.). Additionally, inspection schedule 60 could change based on one or more attributes of the inspected object 11 (FIG. 1). For example, a pre-flight inspection of an aircraft will vary based on the schedule, type of aircraft, prior use patterns of the aircraft, etc.

Similarly, the manner in which inspection systems 40A-B implement an inspection can be automatically adjusted by inspection systems 40A-B and/or manually adjusted by user 12. To this extent, inspection systems 40A-B can automatically alter the order of steps and/or manner in which one or more steps are performed based on a use pattern of user 12. For example, schedule system 42 can comprise an internal learning algorithm that notes a pattern of use of user 12. Additionally, user 12 could use schedule system 42 to designate a set of his/her preferences in conducting a particular inspection. In either case, while user 12 performs an inspection, such as a commercial vehicle inspection, schedule system 42 can note a preference to obtain various images of all the brakes while they are not applied, have the brakes applied, and then obtain the various images of all the brakes while the are applied. However, another user 12 could prefer to obtain all images (applied and not applied) for a subset (e.g., one or two) of the brakes. As a result, based on the particular user 12, inspection system 40A-B can alter the order of steps presented in order to obtain the brake images.

Prior to initiating inspection schedule 60, verification system 48 can first attempt to verify the access rights of user 12 to use inspection system 40A and/or utilize inspection schedule 60. The access rights can be verified using any known solution. For example, user 12 can be required to provide a user name and/or password that is verified using value(s) included in inspection schedule 60 and/or stored and managed by inspection system 40B. Further, data sensing system 30 can obtain one or more attributes of user 12 (e.g., fingerprint, retinal scan, etc.) that are used to verify the identity of user 12 and his/her access rights to inspection schedule 60. In this case, verification system 48 can obtain the expected attribute(s) from central repository 18 for comparison. Alternatively, the attribute(s) of user 12 can be provided to inspection system 40B (e.g., by operating handheld computing system 14), which in turn performs the comparison and returns an indication of success/failure to verification system 48.

Regardless, if verification system 48 fails to verify the access rights of user 12, security system 50 can perform one or more security actions in response to the failure. For example, verification system 48 can provide user 12 with three opportunities to correctly provide a user name and password. Should user 12 fail on all three opportunities, verification system 48 can notify security system 50 of an identification failure. In response, security system 50 can perform one or more security actions. For example, security system 50 can send a notification to base station 16 and/or central repository 18 indicating that handheld computing device 14 may have been obtained by an invalid user. Further, security system 50 can lock one or more operations of handheld computing device 14 and/or inspection system 40A thereby preventing access to these operations until a particular unlocking solution is performed, delete some or all of inspection schedule 60 and/or set of attributes 62 stored on handheld computing device 14, and the like.

In any event, once schedule system 42 successfully initiates inspection schedule 60 and/or verification system 48 has successfully verified the access rights of user 12, acquisition system 44 can perform the inspection based on inspection schedule 60. In one embodiment, acquisition system 44 can prompt user 12 to acquire one or more of a set of attributes 62 defined by inspection schedule 60. In this case, a series of prompts can be used to obtain one or more attributes until all of set of attributes 62 have been received. Each prompt can comprise any type of prompt. For example, acquisition system 44 can display a name/description of the attribute(s) on handheld computing device 14 and/or generate a sound for user 12. The sound can comprise any desired sound, such as a synthesized aural request for the attribute(s), a notification sound/sound recording, and the like.

In response to the prompt, acquisition system 44 can receive one or more of set of attributes 62. Acquisition system 44 can receive the attribute(s) using any known solution. For example, user 12 can observe/obtain one or more of the attributes manually. In this case, user 12 can enter in the attribute(s) using a keypad, pointing device, or other I/O device 28. To this extent, user 12 can speak the attribute(s), and acquisition system 44 can translate the spoken attribute(s) into data that is stored for the corresponding attribute(s). In one embodiment, acquisition system 44 performs context-based voice recognition. For example, acquisition system 44 can use menu-driven speech recognition in which a set of words to be recognized varies based on a current location in a set of menus. In this case, the potential set of words to be recognized remains small, thereby limiting potential conflicts and simplifying training of the voice-recognition system.

Additionally, one or more of set of attributes 62 can be received from data sensing system 30. Data sensing system 30 can comprise any combination of various sensing and/or illuminating devices, which can vary based on the particular inspection being performed. For example, data sensing system 30 can comprise one or more of a light sensing device and a corresponding light emitting device for illuminating the relevant portions of object 11, a chemical analysis system, one or more sensors for detecting temperature (e.g., infrared, heat, or the like), an air analysis system, humidity, sound, or the like, a breathalyser, etc. Additionally, data sensing system 30 can interrogate one or more in-situ sensing systems (e.g., tire pressure) to obtain one or more of set of attributes 62. One possible configuration of a data sensing system 30 that includes sensing and illuminating devices is discussed further below in connection with obtaining attributes for an illustrative inspection. Regardless, user 12 can utilize handheld computing device 14 to operate data sensing system 30 to acquire the one or more of set of attributes 62. Once acquired, data sensing system 30 can provide the attribute(s) to acquisition system 44, which can store the attribute(s) in set of attributes 62.

Once some or all of set of attributes 62 have been received by handheld computing device 14, communication system 46 can communicate one or more of set of attributes 62 to base station 16 (e.g., inspection system 40B) for further processing and/or more permanent storage. Communication system 46 can communicate set of attributes 62 after the inspection has been performed, upon request by user 12, after a group of inspections have been performed, or the like. In one embodiment, communication system 46 first encrypts set of attributes 62 prior to communicating them to base station 16. Communication system 46 can implement any solution for encrypting data, such as using public/private keys. Further, communication system 46 can add a watermark or the like to provide additional identifying characteristics for authenticating the set of attributes 62. Still further, communication system 46 can utilize a "smart burst" messaging solution in order to save power and extend the battery life of handheld computing device 14.

Additionally, communication system 46 can compress set of attributes 62 prior to communicating them to base station 16. Set of attributes 62 can be compressed using any known "lossless" and/or "lossy" solution. For example, set of attributes 62 can be compressed using one or more of Huffman coding, Lempel-Zif-Welch (LZW) compression, discrete cosine transforms (e.g., JPEG, MPEG, etc.), wavelet compression, and the like. To this extent, when one or more attributes in set of attributes 62 comprises image and/or sound data, communication system 46 can identify a "region of interest" and remove and/or reduce data from the attribute that is not within the region of interest. A region of interest comprises the portion of the data for the attribute that provides the desired information. For example, an image of a driver may include data from the background behind the driver. In this case, the image data that corresponds to the background can be removed from the image, and the remaining image data can be communicated to base station 16 as the attribute.

In any event, evaluation system 54 can evaluate set of attributes 62. In particular, evaluation system 54 can compare set of attributes 62 with one or more expected ranges/values for the inspection. Based on this evaluation, evaluation system 54 can generate a result of the inspection and provide it to handheld computing device 14 for display to user 12. Subsequently, user 12 can take an appropriate action based on the result. For example, user 12 can allow an inspected vehicle to continue traveling, impound object 11 for failing the inspection, issue a ticket, warning, citation, or the like, take one or more corrective measures, etc.

When evaluating set of attributes 62, one or more attributes may require the acquisition of one or more additional attributes. In this case, query system 56 can generate a query for a set of additional attributes, and provide the query to handheld computing device 14. In response, acquisition system 44 can receive the query and acquire the set of additional attributes. In particular, acquisition system 44 can prompt user 12 to acquire the set of additional attributes, and can receive the set of additional attributes in the same manner as described above. Additionally, communication system 46 can communicate the set of additional attributes to base station 16 and/or evaluation system 54 can evaluate the set of additional attributes.

As discussed previously, inspection system 40A and/or 40B can send/receive data with a central repository 18. To this extent, query system 56 can send one or more queries to central repository 18 to further evaluate one or more of the set of attributes 62. For example, central repository 18 can comprise a set of background data for the inspection that is made available by one or more government agencies and/or other information source(s). In this case, query system 56 can send a query to and obtain background data from central repository 18. The background data can be used by evaluation system 54 when evaluating set of attributes 62. For example, query system 56 can provide one or more attributes on an individual (e.g., name, driver's license number, etc.) to central repository 18, which comprises a database of wanted individuals or the like. Subsequently, the attribute(s) can be compared to the database, and a result returned based on whether a match is found. Additionally, query system 56 can update the background data stored at central repository 18 based on the evaluation of one or more of the set of attributes 62. For example, upon completing an inspection, evaluation system 54 can provide some/all of the set of attributes 62 for storage at central repository 18 and/or later retrieval when a future inspection is conducted.

In any event, translation system 58 can manage communications between, for example, inspection system 40B and central repository 18. To this extent, translation system 58 can perform any necessary translations to transform set of attributes 62 into a data format expected/accepted by central repository 18 and/or transform data received from central repository 18 into a data format expected/accepted by inspection system 40B (e.g., evaluation system 54). Additionally, as with communications between handheld computing device 14 and base station 16, the data can be compressed, encrypted, and/or authenticated when being communicated between central repository 18 and base station 16.

Figure 3:
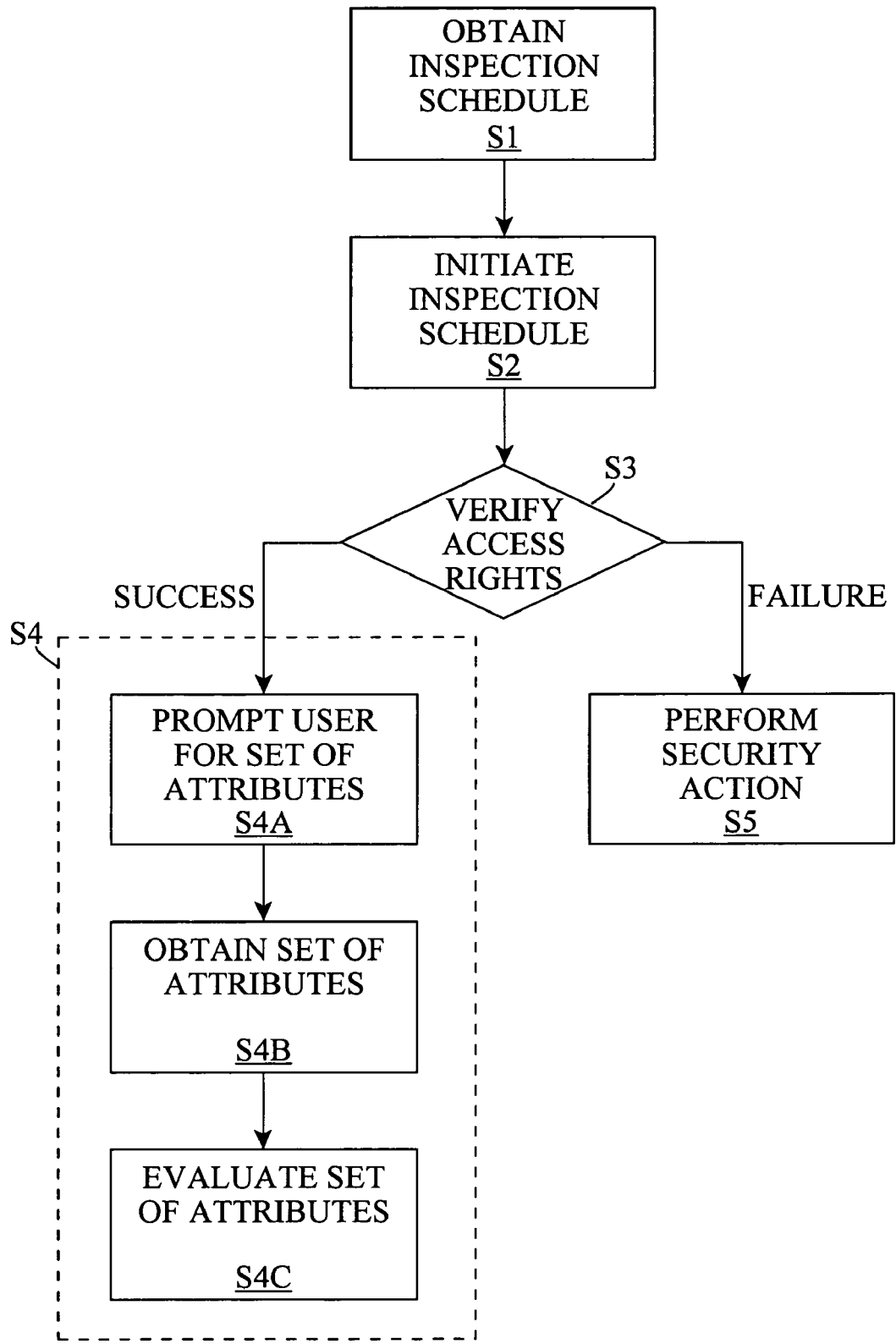
FIG. 3 shows illustrative method steps according to one embodiment of the invention.

The invention also provides a method for performing an inspection. To this extent, FIG. 3 shows illustrative method steps for performing an inspection that can be implemented by the various systems shown in FIG. 2. In step S1, an inspection schedule for the inspection is obtained on handheld computing device 14 (FIG. 2). In step S2, the inspection schedule is initiated. In step S3, the access rights for user 12 (FIG. 2) are verified. If the verification is successful, then in step S4, the inspection is performed using handheld computing device 14. In particular, in step S4A, user 12 is prompted for a set of attributes based on the inspection schedule, in step S4B, the set of attributes are obtained on handheld computing device 14, and in step S4C, the set of attributes are evaluated. If the verification in step S3 fails, then in step S5, one or more security actions are performed. It is understood that these steps are only illustrative. To this extent, the steps can be performed in a different order and/or concurrently, one or more steps may not be performed, and/or additional steps may be implemented.

Handheld computing device 14 (FIG. 1) can comprise any type of off-the-shelf or customized computing system. In the former case, handheld computing device 14 can comprise a wrist and/or belt-mounted computing system capable of performing the various functions discussed herein. In the latter case, handheld computing device 14 can comprise a personal digital assistant (PDA). Similarly, data sensing system 30 (FIG. 1) can comprise any type of off-the-shelf or customized data sensing system that can be configured to operate in conjunction with handheld computing device 14.

Figure 4A:
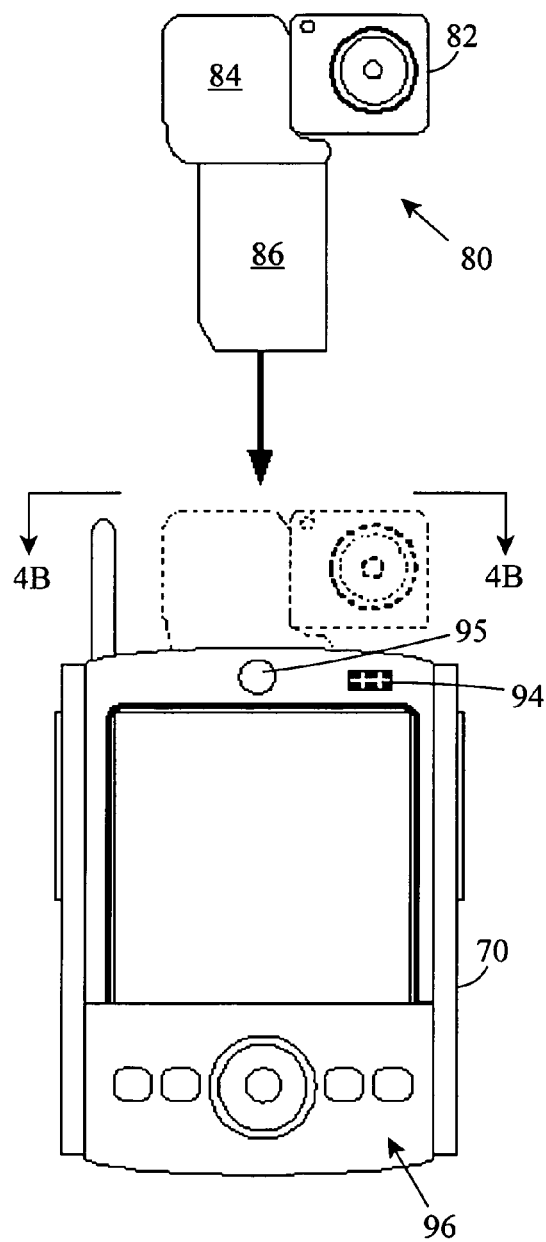
FIGS. 4A-B show alternative views of an illustrative personal digital assistant (PDA) and sensor head according to one embodiment of the invention.
Figure 4B:
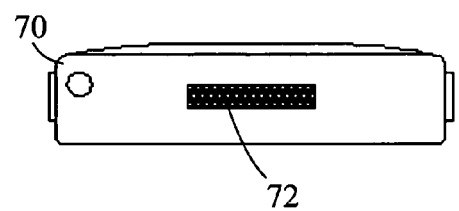

For example, FIGS. 4A-B show alternative views of an illustrative PDA 70 and a sensor head 80. Sensor head 80 enables a data sensing system 82 to be mounted to and communicate with PDA 70. As shown, sensor head 80 includes data sensing system 82 that can be attached to a base 84. Base 84 supports data sensing system 82 and can enable it to communicate with and/or be mounted to PDA 70 via a connector 86 attached thereto. In particular, connector 86 can be inserted into a communications slot 72 included in PDA 70. Additionally, base 84 can be configured to provide additional structural support for data sensing system 82 when connector 86 is inserted into slot 72. In any event, connector 86 and slot 72 can comprise any type of male/female-type connection system for providing a physical communications link between two computing systems as are known in the art. To this extent, the size and/or shape of connector 86 and slot 72 are only illustrative and do not limit the invention to the use of any particular connection system.

When mounted to PDA 70, sensor head 80 supports data sensing system 82 in a manner that enables its operation as a physical extension of PDA 70. To this extent, base 84 and connector 86 can comprise various components that provide a physical communications link and/or power between data sensing system 82 and PDA 70 when connector 86 is inserted in slot 72. Alternatively, base 84 can comprise a wireless communications system that communicates with data sensing system 82, and which in turn communicates with PDA 70 via connector 86 and slot 72. In either case, data sensing system 82 can be permanently or temporarily mounted to base 84 using any known solution.

Figure 5B:
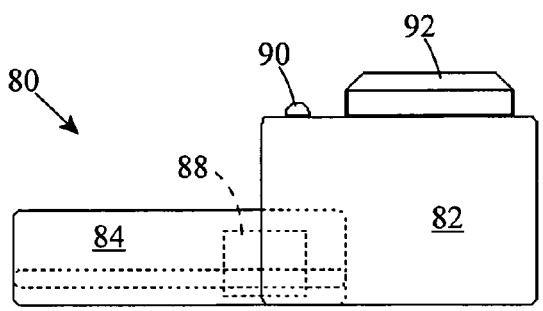
FIGS. 5A-C show alternative views of one embodiment of the sensor head shown in FIGS. 4A-B.
Figure 5A:
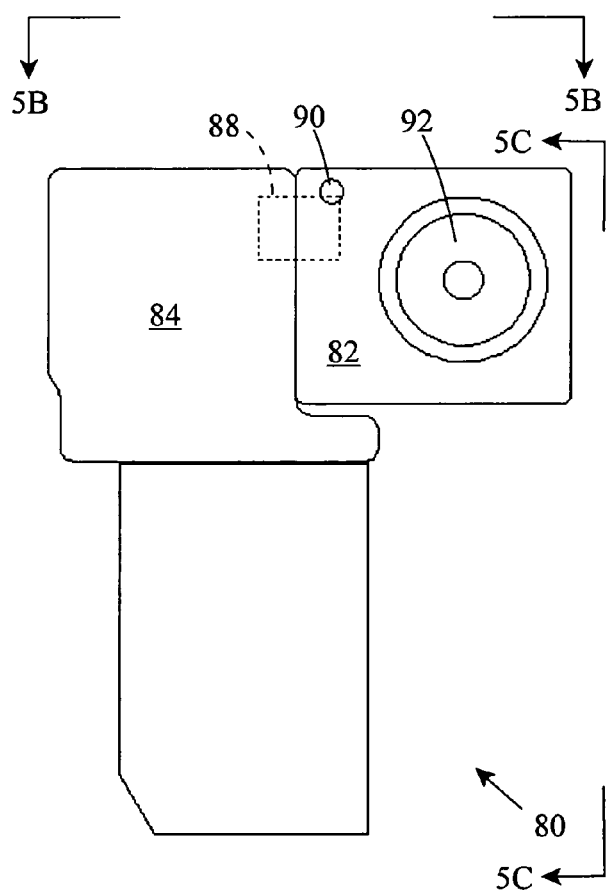
Figure 5C:
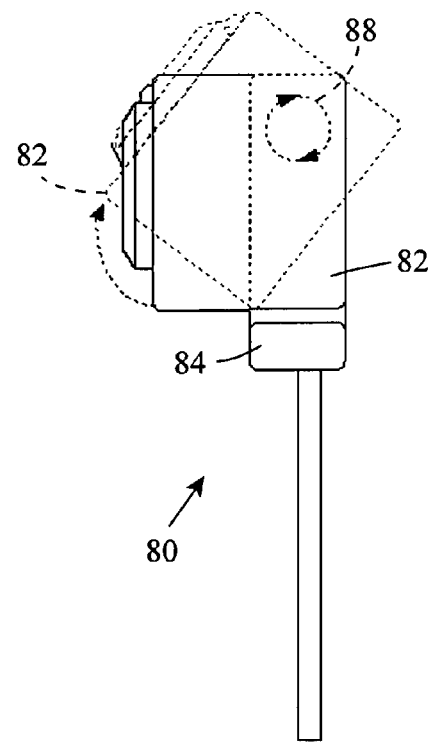

To this extent, FIGS. 5A-C show alternative views of one embodiment of sensor head 80. In particular, data sensing system 82 is mounted to base 84 using a connector 88. As shown in FIG. 5C, connector 88 enables data sensing system 82 to be rotated independently of base 84 (and therefore PDA 70 of FIG. 4A). In this manner, a direction of operation for one or more sensing devices included in data sensing system 82 can be adjusted independently of base 84 and PDA 70. Connector 88 can enable limited or unlimited adjustment of the direction of operation for data sensing system 82 with respect to PDA 70. Further, connector 88 can include one or more components that provide a physical communications/power link between data sensing system 82 and base 84.

In any event, data sensing system 82 can comprise one or more devices for performing the inspection. In one embodiment, data sensing system 82 includes a light source 90 and a light sensing device 92. In this case, light source 90 can comprise any type of light generating device such as one or more light emitting diodes (LEDs), an incandescent light, a strobe light, a laser, and the like. Further, the light can comprise any combination of visible and/or non-visible wavelengths, e.g., visible, infrared, multi-spectral, etc. Light sensing device 92 can comprise a digital camera or the like having any desired/required resolution. In operation, light source 90 can illuminate an area that is to be imaged using light sensing device 92. To this extent, light sensing device 92 can be used in environments with varying ambient light conditions. Additionally, light source 90 can illuminate object 11 (FIG. 1) in such a manner that additional data is provided for analysis in the resulting image. For example, light source 90 can illuminate object 11 with one or more laser lines, that are subsequently imaged using light sensing device 92 and processed to determine a shape of a particular portion of object 11. Similarly, light source 90 can illuminate a bar code or the like, that is subsequently read using light sensing device 92.

Returning to FIG. 4A, PDA 70 can include one or more devices for performing the inspection. For example, PDA 70 is shown including a sound sensing device 94, such as a microphone, a sound emitting device 95, such as a speaker, and one or more input/output (I/O) devices 96 that enable user 12 (FIG. 2) to view and enter text and other graphical information. While PDA 70 is shown having a particular configuration of I/O devices 96, it is understood that I/O devices 96 are only illustrative. As a result, PDA 70 can have any desired configuration of I/O devices 96. Further, it is understood that one or more devices (e.g., sound sensing device 94) could be included as part of data sensing system 82 and/or PDA 70 can include one or more additional devices (e.g., light sensing device 92 of FIG. 5A).

In one application, PDA 70 and data sensing system 82 are used to perform an inspection on a commercial vehicle. In this case, while user 12 (FIG. 2) is performing the inspection, PDA 70 and/or data sensing system 82 can obtain set of attributes 62 (FIG. 2). For example, data sensing system 82 can be used to obtain one or more attributes such as a photograph of a portion of the commercial vehicle, the driver, read a bar code on a license or a cargo manifest, and the like. Similarly, PDA 70 can be used to record information on the commercial vehicle and/or driver, receive a license plate number, and the like.

Additionally, PDA 70 can operate in a voice-activated manner, thereby allowing user 12 (FIG. 2) to speak one or more of set of attributes 62 (FIG. 2) for receipt by PDA 70. In this case, user 12 can operate PDA 70 without the use of his/her hands. For example, PDA 70 can include a known solution for mounting PDA 70 to the body/clothing of user 12 (e.g., a belt clip). When an inspection begins, PDA 70 can prompt user 12 by generating a sound (e.g., synthesized text, sound recording, etc.) using sound emitting device 95 to request one or more of set of attributes 62. Subsequently, acquisition system 44 (FIG. 2) can wait for user 12 to speak the requested attribute(s) into sound sensing device 94, and process the sound data to obtain the requested attribute(s) in a known manner. To this extent, sound sensing device 94 can be used to record an interview with the driver, thereby eliminating the need for user 12 to make manual notes.

As a result, PDA 70 and data sensing system 82 enable set of attributes 62 (FIG. 2) to be readily obtained and stored, thereby eliminating the requirement that user 12 (FIG. 2) manually record information (e.g., notes on a driver interview) and later transpose the information onto an inspection form. Further, additional information (e.g., driver's photograph) can be obtained during the inspection and evaluated (e.g., compared with a law enforcement database). Still further, one or more of set of attributes 62 can be obtained without the use of either or both hands of user 12.

Figure 6:
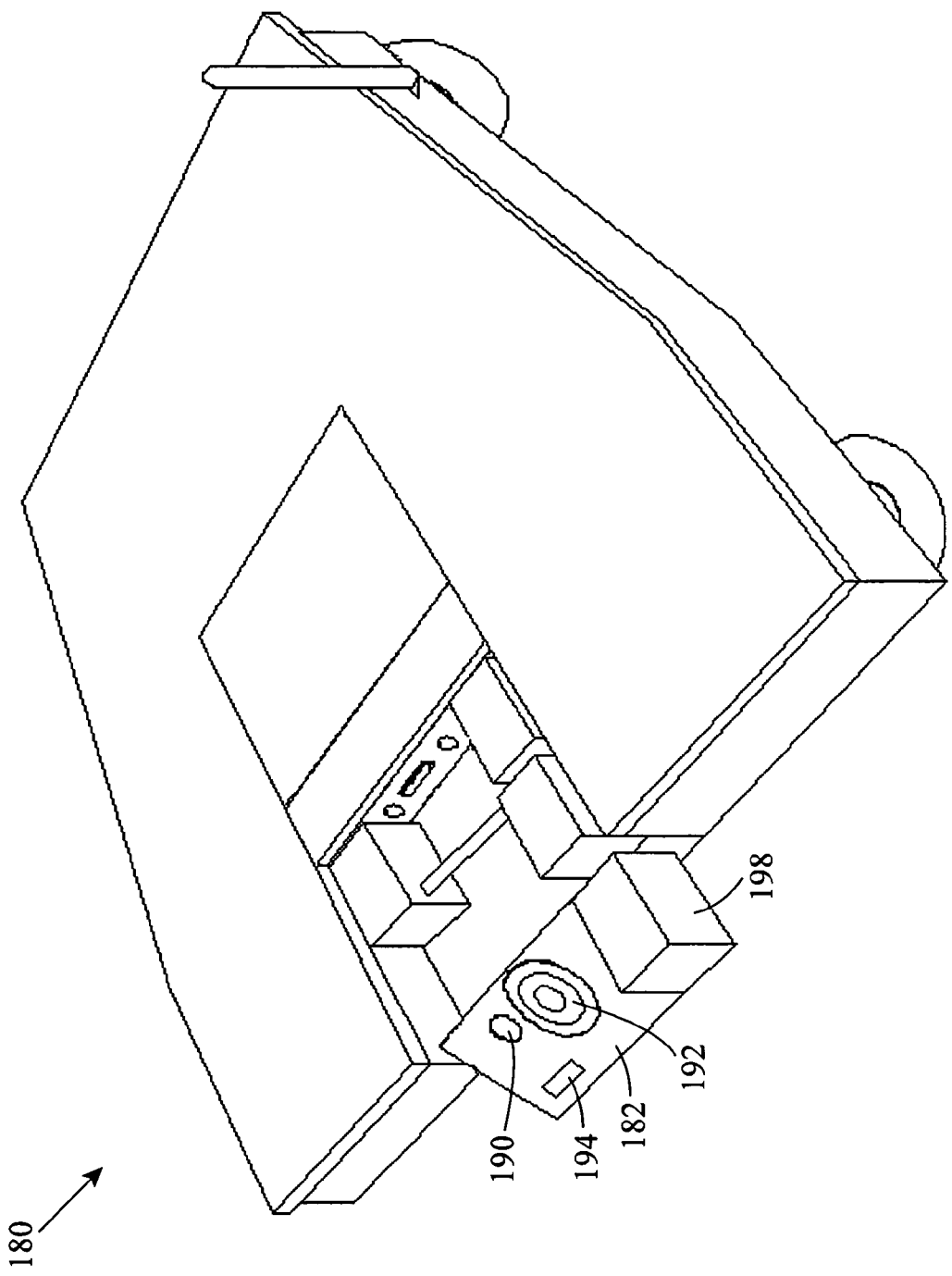
FIG. 6 shows a mobile unit that can be used to position a data sensing system according to one embodiment of the invention.

Sensor head 80 is only illustrative of various possible embodiments for mounting and/or positioning data sensing system 82. In one embodiment, the sensor head comprises a handheld device that includes one or more I/O devices and communicates with another system (e.g., handheld computing device 14 of FIG. 2) which implements the various functionality. FIG. 6 shows another embodiment in which a mobile unit 180 is used to position a data sensing system 182. As shown, data sensing system 182 can include one or more devices used in obtaining set of attributes 62 (FIG. 2) such as a light source 190, a light sensing device 192, and/or a sound sensing device 194. In order to position data sensing system 82, user 12 (FIG. 2) can locate mobile unit 180 in a desired position by remotely controlling a direction of travel of mobile unit 180 by utilizing handheld computing device 14 (FIG. 2). To this extent, mobile unit 180 can include a wireless communications system, wheels, a motor system, a steering system, etc., as are known in the art, while sensor head 80 (FIG. 5A) can comprise a wireless communication system for controlling mobile unit 180. Additionally, mobile unit 180 can further include a sensor positioning system 198 that can adjust the position/angle of data sensing system 82 with respect to mobile unit 180 in one or more directions. Acquisition system 44 (FIG. 2) can enable user 12 to send commands to position mobile unit 180 and receive data from mobile unit 180. Mobile unit 180 can include various other systems for obtaining the attributes, such as a computing system for receiving and processing data, a power supply, components for connecting the various devices, etc.

As shown, mobile unit 180 is configured such that it can be positioned underneath a commercial vehicle or the like, in order to obtain one or more attributes of the commercial vehicle. For example, mobile unit 180 can be used to measure a brake push rod adjustment of the braking system on the corresponding commercial vehicle. In this case, acquisition system 44 (FIG. 2) can obtain data using mobile unit 180, and evaluation system 54 (FIG. 2) can perform machine vision-based measurement on the brake push rod adjustment using the collected data.

Figure 7A:
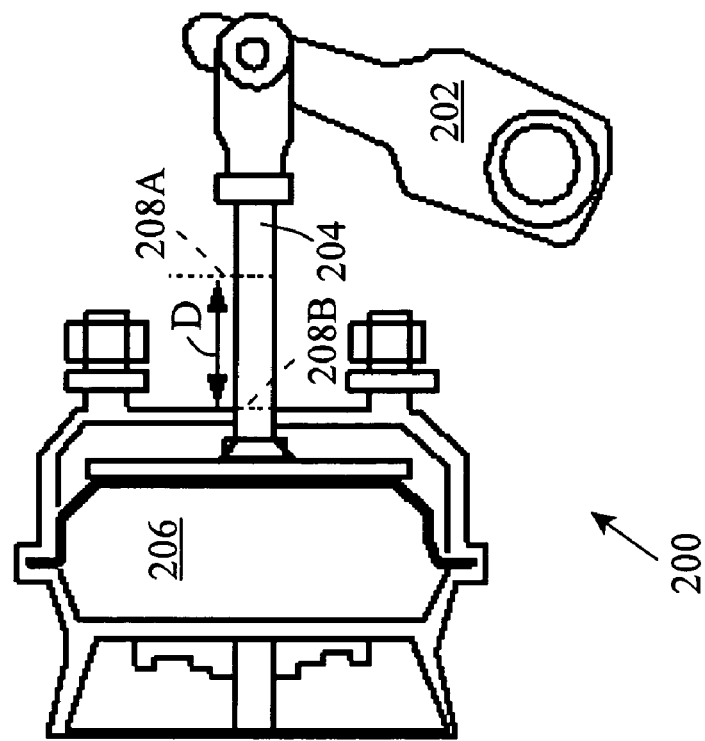
FIGS. 7A-B show a typical air brake system of a commercial vehicle while in the "off" and "on" positions, respectively.
Figure 7B:
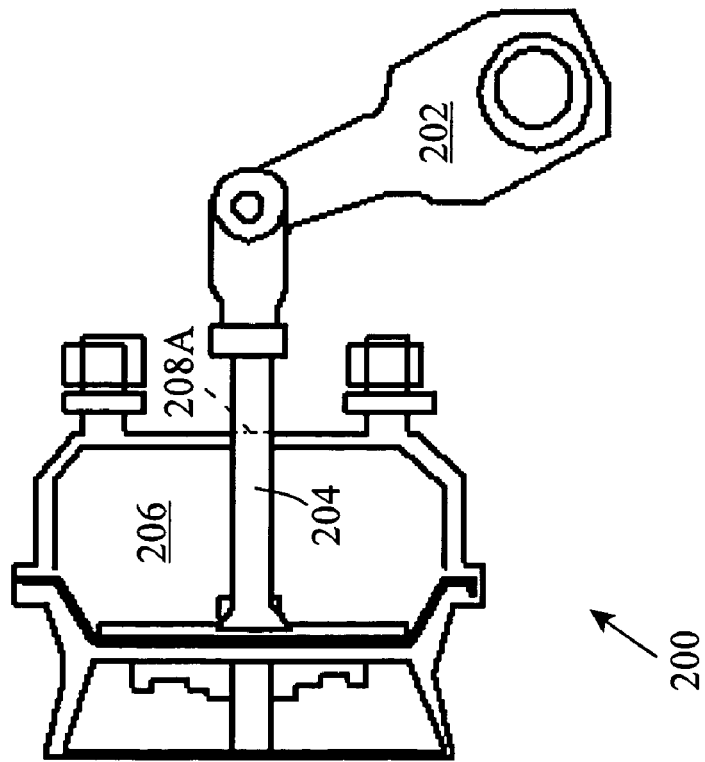

FIGS. 7A-B illustrate the measurement of the brake push rod adjustment according to one embodiment of the invention. In particular, FIG. 7A shows a typical air brake system 200 of a commercial vehicle while in the "off" position, and FIG. 7B shows air brake system 200 while in the "on" position. As shown, air brake system 200 includes a brake cam 202 that is connected to a push rod 204. Push rod 204 passes into brake chamber 206 at varying positions 208A-B when air brake system 200 is "off" and "on," respectively. During inspection, the distance D between these two positions 208A-B is measured. Distance D is compared with a standard distance permitted for the particular type of brake. When distance D varies from the standard distance by a predefined tolerance, the air brake system 200 is considered to be unacceptable.

Referring to FIGS. 6 and 7A-B, using mobile unit 180, distance D can be obtained using image feature extraction and measurement. In particular, mobile unit 180 and/or sensor positioning system 198 can be used to position data sensing system 182 such that push rod 204 can be imaged in both positions. Subsequently, light source 190 and/or light sensing device 192 can be used to obtain images of push rod 204 in the respective positions. Image processing can then be performed on the two images to obtain distance D. In one embodiment, the image retrieval and processing can comprise the system and method as shown and described in U.S. Pat. No. 5,636,026, which is hereby incorporated herein by reference. However, other solutions can be used to obtain distance D as are known in the art.

Figure 7D:
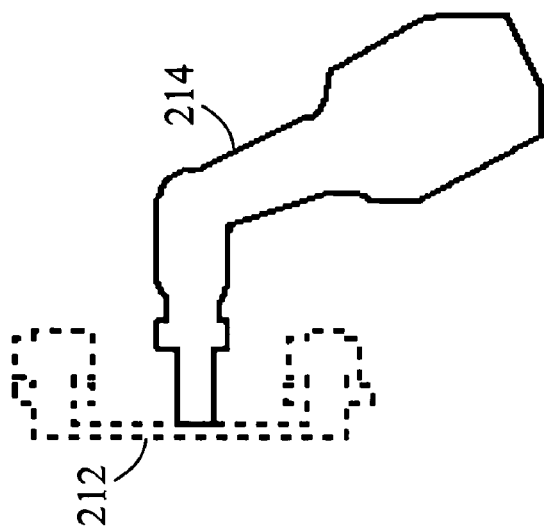
FIGS. 7C-D show an illustrative solution for extracting desired target features for the air brake system of FIGS. 7A-B.
Figure 7C:
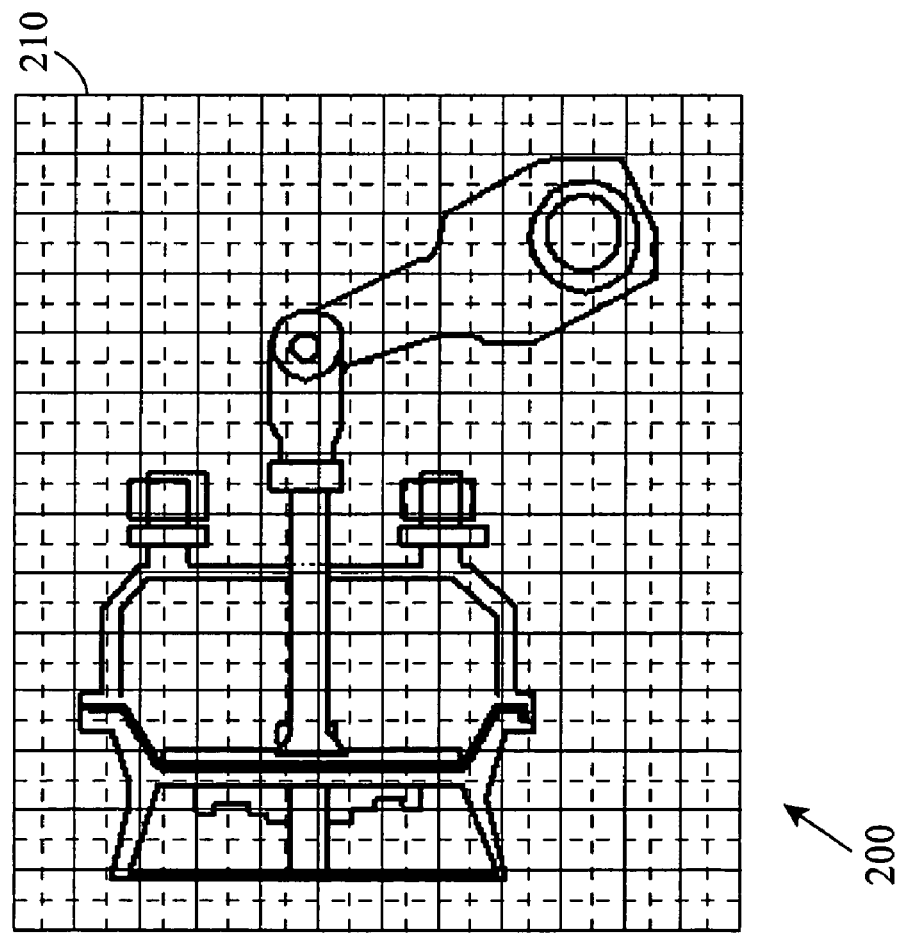

To this extent, FIGS. 7C-D show an illustrative solution for extracting desired target features for air brake system 200. In particular, a grid 210 can be used to calibrate and/or extract data points on air brake system 200. In one embodiment, acquisition system 44 (FIG. 2) can project grid 210 on air brake system 200 and/or superimpose grid 210 either visually or mathematically. In any event, target features 212, 214 can be extracted thereby simplifying the image of air brake system 200 for analysis. It is understood that target features 212, 214 are only illustrative, and additional and/or alternative features of air brake system 200 could be extracted.

Alternatively, FIGS. 8A-B show an illustrative solution for manually and/or semi-automatically obtaining data points for air brake system 200 using images obtained by, for example, mobile unit 180 (FIG. 6). For manual operation, acquisition system 44 (FIG. 2) can prompt user 12 (FIG. 2) to position mobile unit 180 a required distance from and in a required alignment with air brake system 200. In one embodiment, grid 210 (FIG. 7C) could be used to ensure the proper distance and/or alignment. In any event, once aligned, images of brake system 200 while in the "off" (FIG. 8A) and "on" (FIG. 8B) positions can be obtained. Subsequently, user 12 can identify key points P1, P2 in the "off" image and the corresponding points P3, P4 in the "on" image. These points P1-4 can then be used to calculate distance D in a known manner. During semi-automatic operation, user 12 could be prompted to obtain the images as discussed above. However, acquisition system 44 could include image processing functionality that automatically determines points P1-4 and calculates distance D.

Returning to FIG. 1, as part of the commercial vehicle inspection, handheld computing device 14 (e.g., PDA 70 of FIG. 4A) can submit one or more queries to and/or update information stored at central repository 18. For example, central repository 18 can comprise the ASPEN database that is maintained by government inspection agencies for tracking the compliance with various regulations by commercial vehicles and drivers. After the inspection is completed, handheld computing device 14 can provide some or all of the set of attributes 62 (FIG. 2) to central repository 18 for storage. Alternatively, central repository 18 could comprise data related to air brake system 200 (FIG. 7A), which can be queried and retrieved for use in evaluating set of attributes 62. Still further, central repository 18 (FIG. 1) could comprise a database of "deadbeat dads," a law enforcement database of wanted terrorists/criminals, a database of common explosive/contraband concealment configurations, etc., which can be queried as part of the inspection. It is understood that these examples are only illustrative, and various other embodiments of central repository 18 are possible based on a particular inspection application.

It is understood that the inspection of air brake system 200 (FIG. 7A) and/or a commercial vehicle is only illustrative of the various types of inspections and/or measurements for these inspections that can be performed using the invention. To this extent, it is understood that various alternative embodiments of the illustrative embodiments of the invention described herein are possible. For example, mobile unit 180 (FIG. 6) could be used to perform a remote inspection of hazardous materials, explosives, a dangerous location, and the like. Further, numerous combinations of various types of sensing devices and/or illumination devices can be incorporated into mobile unit 180 and/or sensor head 80 (FIG. 4A). To this extent, one or more sensing devices and/or one or more corresponding illumination devices can be included for sensing/illuminating infra-red light, chemical compositions, biological material, radiation, pressure, temperature, vibration, shock, acceleration, etc.

As a result, it is understood that the teachings of the invention can be applied to many disparate inspections applications. For example, in performing a truck inspection, data sensing system 30 (FIG. 1) can comprise one or more environmental sensors. The environmental sensors could enable a truck inspector to detect questionable substances, such as nerve gas, in a tanker truck. Further, the environmental sensors could detect leakage of a hazardous substance by monitoring fumes surrounding the truck. In either case, handheld computing device 14 (FIG. 1) could interact with a central repository 18 (FIG. 1), such as a government agency, to check the substance and/or initiate an appropriate response. Additionally, the invention can be used in inspected various components of a vehicle, such as during a truck inspection. For example, data sensing system 30 could comprise a radio frequency or similar technology that can remotely interrogate tire pressure to determine compliance. Similarly, other vehicle components, such as brake drum inside measurements, tire tread quality, overall truck dimensions, and the like, can be inspected using the invention to verify compliance with the appropriate requirements. In this case, the machine vision discussed above with respect to the air brake system can be readily used to obtain one or more of these measurements. To this extent, the teachings of the invention can be readily applied to numerous applications unrelated to vehicles and vehicle inspections.

Additionally, it should be appreciated that the teachings of the present invention could be offered as a business method on a subscription or fee basis. For example, some or all of inspection systems 40A-B (FIG. 1) and/or base station 16 (FIG. 1) could be created, maintained and/or deployed by a service provider that offers the functions described herein for customers. That is, a service provider could offer to perform an inspection as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Further, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, program product or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of performing an inspection, the method comprising:
   providing a data sensing system;
   mounting the data sensing system to a handheld computing device;
   initiating an inspection schedule on the handheld computing device;
   verifying access rights of a user of the handheld computing device; and
   performing the inspection using the handheld computing device in response to successfully verifying access rights of the user, wherein the performing includes:
      receiving background information that relates to the inspection from a central repository;
      prompting the user of the handheld computing device to acquire a first set of attributes based on the inspection schedule;
      receiving the first set of attributes on the handheld computing device from the data sensing system that is in communication with the handheld computing device;
      evaluating the first set of attributes in accordance with the background information on the handheld computing device;
   wherein the mounting step includes adjusting a direction of operation for the data sensing system independent of the handheld computing device.

2. The method of claim 1, further comprising performing at least one security action in response to failure of the verifying step.

3. The method of claim 1, wherein the receiving of the first set of attributes includes translating an attribute spoken by the user.

4. The method of claim 1, wherein the receiving of the first set of attributes further includes positioning the data sensing system prior to receiving the attributes.

5. The method of claim 1, further comprising communicating the first set of evaluated attributes to at least one of the central repository or a base station.

6. The method of claim 5, wherein the communicating step includes encrypting the first set of evaluated attributes.

7. The method of claim 6, wherein the communicating step includes compressing the first set of evaluated attributes.

8. The method of claim 7, wherein the compressing step includes:
   identifying a region of interest for one of the first set of evaluated attributes; and
   removing data for the one of the first set of evaluated attributes that is not within the region of interest.

9. The method of claim 1, wherein the handheld computing device comprises a personal digital assistant.

10. The method of claim 1, wherein the performing step further includes:
    receiving a query on the handheld computing device;
    prompting the user to acquire a second set of attributes in response to the query; and
    receiving the second set of attributes on the handheld computing device.

11. The method of claim 1, further comprising receiving the inspection schedule on the handheld computing device from the central repository.

12. A system for performing an inspection, the system comprising:
    a data sensing system;
    a remote central repository comprising a plurality of information relating to the inspection;
    a handheld computing device that includes:
       means for verifying access rights of a user;
       means for obtaining background information relating to the inspection from the central repository;
       means for initiating an inspection schedule;
       means for receiving a set of attributes from the data sensing system based on the inspection schedule; and
       means for evaluating the set of attributes in accordance with the background information; and
    means for mounting the data sensing system to the handheld computing device, wherein the means for mounting includes means for adjusting a direction of operation for the data sensing system independent of the handheld computing device.

13. The system of claim 12, wherein the handheld computing device further includes means for performing at least one security action in response to a failure to verify the access rights.

14. The system of claim 12, further comprising a base station, wherein the handheld computing device further includes means for communicating the set of attributes to the base station.

15. The system 14, wherein the means for communicating includes means for encrypting the set of attributes.

16. The system of claim 14, wherein the means for communicating includes means for compressing the set of attributes.

17. The system of claim 12, wherein the handheld computing device comprises a personal digital assistant.

18. The system of claim 12, wherein the handheld computing device further includes means for querying the central repository for additional information that is ancillary to the evaluation of the set of attributes.

19. A personal digital assistant (PDA) comprising:
    means for mounting to a data sensing system;
    means for communicating with the data sensing system and a remote central repository;

means for performing an inspection that includes:
- means for verifying access rights of a user;
- means for obtaining background information relating to the inspection from the central repository;
- means for initiating an inspection schedule for the inspection;
- means for receiving a set of attributes based on the inspection schedule, wherein at least a portion of the set of attributes is received from the data sensing system; and
- means for evaluating the set of attributes in accordance with the background information; and wherein the means for communicating includes means for adjusting a direction of operation for the data sensing system independent of the PDA.

20. The PDA of claim 19, further comprising means for performing at least one security action in response to a failure to verify the access rights.

21. The PDA of claim 19, wherein the communicating means communicates the set of attributes to at least one of a 22. The PDA of claim 19, further including means for querying the central repository for additional information that is ancillary to evaluation of the set of attributes.

23. A program product stored in a computer-readable medium, which when executed, enables a user of a personal digital assistant (PDA) to perform an inspection, the program product comprising:
- means for mounting to a data sensing system;
- means for communicating with the data sensing system and a remote central repository;
- means for verifying access rights of the user;
- means for obtaining background information relating to the inspection from the central repository;
- means for initiating an inspection schedule for the inspection;
- means for receiving a set of attributes based on the inspection schedule, wherein at least a portion of the set of attributes is received from the data sensing system; and
- means for evaluating the set of attributes in accordance with the background information;

wherein the means for mounting includes means for adjusting a direction of operation for the data sensing system independent of the PDA.

24. The program product of claim 23, further comprising means for performing at least one security action in response to a failure to verify the access rights.

25. The program product of claim 23, further comprising means for receiving a query.

26. The program product of claim 23, further comprising means for querying the central repository for additional information that is ancillary to the evaluation of the set of attributes.

27. The program product of claim 23, further comprising means for acquiring an inspection schedule from the central repository.

* * * * *

UNITED STATES PATENT AND TRADEMARK OFFICE
CERTIFICATE OF CORRECTION

PATENT NO. : 7,536,278 B2 Page 1 of 1
APPLICATION NO. : 11/136207
DATED : May 19, 2009
INVENTOR(S) : Zahid F. Mian et al.

It is certified that error appears in the above-identified patent and that said Letters Patent is hereby corrected as shown below:

Col. 16, line 6 - change "claim 6" to --claim 5--

Col. 17, line 13 - change "communicating" to --mounting--

Col. 17, line 20 - after the words "at least one of a" insert the words --base station or the central repository.--

Signed and Sealed this

Second Day of February, 2010

David J. Kappos
*Director of the United States Patent and Trademark Office*